(12) United States Patent
Nagayama (10) Patent No.: US 9,392,289 B2
(45) Date of Patent: Jul. 12, 2016

(54) VIDEO ENCODING SYSTEM, PROGRAM BANK DEVICE, AND VIDEO ENCODING METHOD

(75) Inventor: Suguru Nagayama, Tokyo (JP)

(73) Assignee: NEC Corporation, Tokyo (JP)

( * ) Notice: Subject to any disclaimer, the term of this patent is extended or adjusted under 35 U.S.C. 154(b) by 310 days.

(21) Appl. No.: 14/344,303

(22) PCT Filed: Jun. 6, 2012

(86) PCT No.: PCT/JP2012/003702
§ 371 (c)(1),
(2), (4) Date: Mar. 11, 2014

(87) PCT Pub. No.: WO2013/038582
PCT Pub. Date: Mar. 21, 2013

(65) Prior Publication Data
US 2014/0369403 A1 Dec. 18, 2014

(30) Foreign Application Priority Data
Sep. 12, 2011 (JP) .................................. 2011-198311

(51) Int. Cl.
*H04N 19/115* (2014.01)
*H04N 19/136* (2014.01)
*H04N 21/2365* (2011.01)
*H04N 19/172* (2014.01)
(Continued)

(52) U.S. Cl.
CPC ........ *H04N 19/136* (2014.11); *G06F 17/30781* (2013.01); *H04N 19/103* (2014.11); *H04N 19/115* (2014.11); *H04N 19/164* (2014.11); *H04N 19/172* (2014.11); *H04N 21/23655* (2013.01)

(58) Field of Classification Search
None
See application file for complete search history.

(56) References Cited

U.S. PATENT DOCUMENTS 8,428,148 B2 4/2013 Kurosawa
2001/0000675 A1* 5/2001 Obikane ............ H04N 21/2365
348/385.1
(Continued)

FOREIGN PATENT DOCUMENTS

JP 11-308615 A 11/1999
JP 2005-151095 A 6/2005
(Continued)

OTHER PUBLICATIONS

International Search Report (ISR) (PCT Form PCT/ISA/210), in PCT/JP2012/003702, dated Aug. 28, 2012.

*Primary Examiner* — Christopher S Kelley
*Assistant Examiner* — Kaitlin A Retallick
(74) *Attorney, Agent, or Firm* — McGinn IP Law Group, PLLC (57) ABSTRACT

Encoders of a program bank device perform compression coding on video/voice data of a program from program VTRs, and extract an image feature value of video data of the program to be accumulated in a program database. When a time earlier by a predetermined time than a program delivery time indicated by program operation information from a program operation management server is reached, the program database notifies a statistical multiplexing controller of an image feature value and preliminarily calculates a video encoding bit rate by statistical multiplexing analysis processing. When the program delivery time is reached, the video/voice data of the program from the program database is decoded by decoders and output to delivery encoders at a timing when the data is output to the delivery encoders.

9 Claims, 3 Drawing Sheets

(51) Int. Cl.
*H04N 19/103* (2014.01)
*H04N 19/164* (2014.01)
*G06F 17/30* (2006.01)

(56) References Cited

U.S. PATENT DOCUMENTS

| | | | | |
|---|---|---|---|---|
| 2002/0136406 | A1* | 9/2002 | Fitzhardinge | H04N 5/913 380/210 |
| 2004/0013136 | A1* | 1/2004 | Mailhot | H04N 7/17309 370/537 |
| 2004/0196907 | A1* | 10/2004 | Mihara | H04N 21/2365 375/240.12 |
| 2005/0010960 | A1* | 1/2005 | Kitazawa | H04N 21/23655 725/117 |
| 2005/0105563 | A1* | 5/2005 | Suzuki | H04J 3/1682 370/535 |
| 2006/0018379 | A1* | 1/2006 | Cooper | H04N 21/234381 375/240.12 |
| 2008/0187054 | A1* | 8/2008 | Kurosawa | H04N 21/233 375/240.26 |

FOREIGN PATENT DOCUMENTS

| | | |
|---|---|---|
| JP | 2006-74332 A | 3/2006 |
| JP | 2008-193202 A | 8/2008 |
| JP | 2010-219623 A | 9/2010 |
| WO | WO 99/01987 A1 | 1/1999 |

* cited by examiner

VIDEO ENCODING SYSTEM, PROGRAM BANK DEVICE, AND VIDEO ENCODING METHOD

TECHNICAL FIELD

The present invention relates to a video encoding system, a program bank device, and a video encoding method. More specifically, the present invention relates to a video encoding system, a program bank device, and a video encoding method that employ a statistical multiplexing control system in cooperation with a program operation management server. The present invention can be suitably applied to broadcasting systems for terrestrial digital broadcasting, cable television broadcasting, BS (Broadcasting Satellite) satellite broadcasting, CS (Communications Satellite) satellite broadcasting, IPTV (Internet Protocol Television) broadcasting, and the like.

BACKGROUND ART

Patent Literature 1 (Japanese Unexamined Patent Application Publication No. 2006-74332 "Multiplex Transmission Apparatus and Method") discloses a method for performing a statistical multiplexing control in a real-time encoder. According to this method, however, it is necessary to delay a video until completion of the statistical multiplexing control by using a two-pass real-time encoder including a delay circuit so as to follow a steep change in an image feature value.

Figure 3:
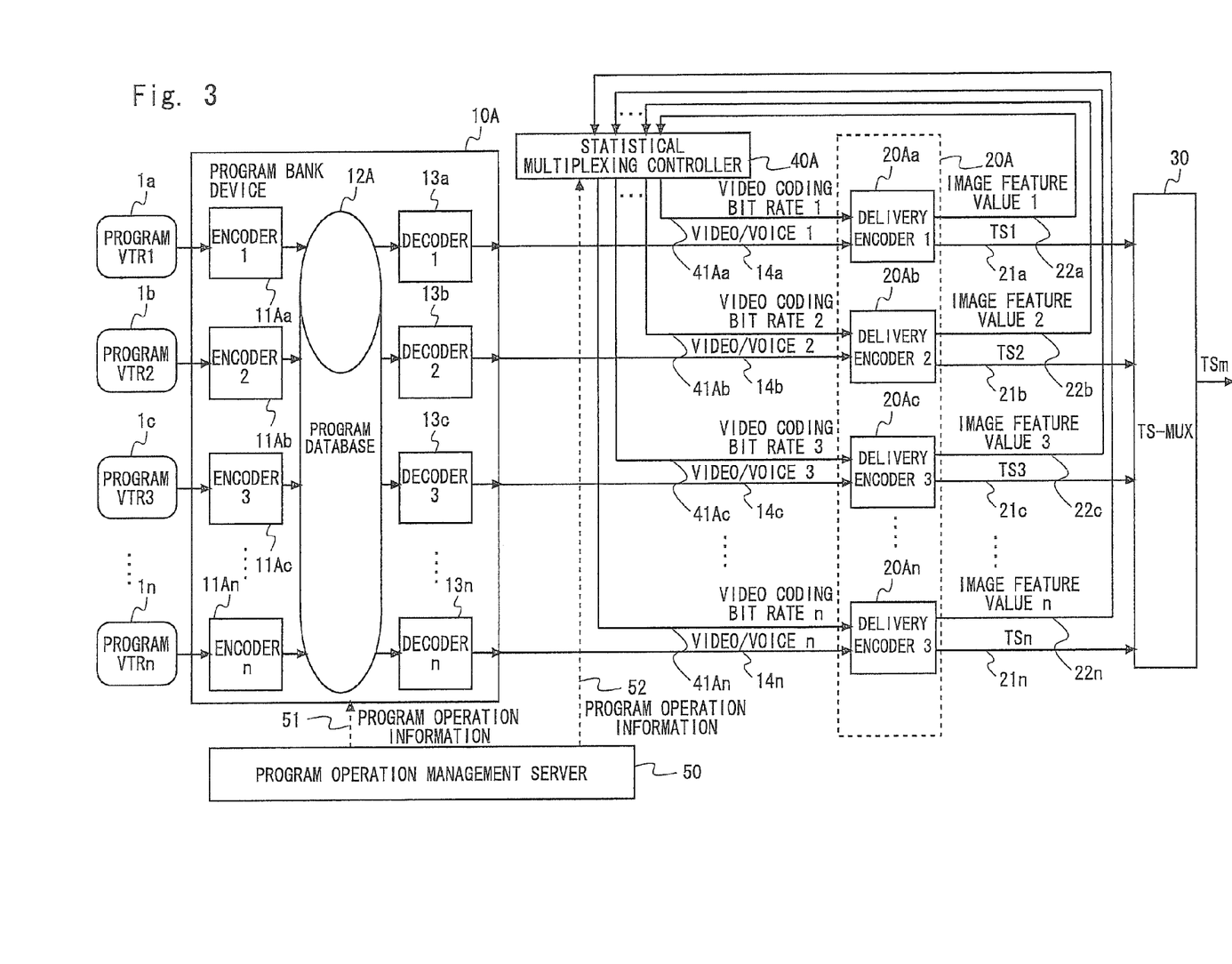
FIG. 3 is a system configuration diagram showing a system configuration of a video encoding system of a related art.

Further, in the case of performing the statistical multiplexing control without delaying a video, a system configuration as shown in FIG. 3 is employed. FIG. 3 is a system configuration diagram showing a system configuration of a video encoding system of a related art. A video encoding system shown in FIG. 3 includes a program bank device 10A, a delivery encoder group 20A, a TS-MUX 30, and a statistical multiplexing controller 40A, and operates in cooperation with a program operation management server 50.

Program video/voice information is recorded in a first program VTR 1a, a second program VTR 1b, a third program VTR 1c, . . . , and an n-th program VTR 1n, for example, for each program. These pieces of information are respectively compression-coded by a first encoder 11Aa, a second encoder 11Ab, a third encoder 11Ac, . . . , and an n-th encoder 11An of the program bank device 10A, and are accumulated in a program database 12A of the program bank device 10A. Note that in FIG. 3, the terms "first xx", "third xx", "second xx", and "n-th xx" of the first program VTR 1a, the second program VTR 1b, the third program VTR 1c, . . . , and the n-th program VTR 1n, the first encoder 11Aa, the second encoder 11Ab, the third encoder 11Ac, . . . , and the n-th encoder 11An, and the like are represented as "xx1", "xx2", "xx3", . . . , and "xxn" so as to simplify the illustration (the same is applied to the other terms).

In this case, program operation information 51 is input from the program operation management server 50 that operates in cooperation. Then, the corresponding program video/voice data is retrieved from the program database 12A, and is decoded by a first decoder 13a, a second decoder 13b, a third decoder 13c, . . . , and an n-th decoder 13n. Decoded signals are output to the delivery encoder group 20A as a first video/voice 14a, a second video/voice 14b, a third video/voice 14c, . . . , and an n-th video/voice 14n. The delivery encoder group 20A includes a first delivery encoder 20Aa, a second delivery encoder 20Ab, a third delivery encoder 20Ac, . . . , and an n-th delivery encoder 20An.

In the delivery encoder group 20A, upon receiving the videos/voices 14a, 14b, 14c, . . . , and 14n, the delivery encoders analyze a first image feature value 22a, a second image feature value 22b, a third image feature value 22c, . . . , and an n-th image feature value 22n, respectively. The first image feature value 22a, the second image feature value 22b, the third image feature value 22c, . . . , and the n-th image feature value 22n are fed back to the statistical multiplexing controller 40A. The first image feature value 22a, the second image feature value 22b, the third image feature value 22c, . . . , and the n-th image feature value 22n are necessary for encoding data into a state compatible with a transport stream (TS) format of each of a first TS 21a, a second TS 21b, a third TS 21c, . . . , and an n-th TS 21n.

The statistical multiplexing controller 40A refers to program operation information 52 supplied from the program operation management server 50. Further, the statistical multiplexing controller 40A performs statistical multiplexing analysis processing using the image feature values fed back from the respective delivery encoders of the delivery encoder group 20A. Through the processing, a first video encoding bit rate 41Aa, a second video encoding bit rate 41Ab, a third video encoding bit rate 41Ac, . . . , and an n-th video encoding bit rate 41An, which are suitable for encoding each video data, are obtained. The first video encoding bit rate 41Aa, the second video encoding bit rate 41Ab, the third video encoding bit rate 41Ac, . . . , and the n-th video encoding bit rate 41An are respectively output to the first delivery encoder 20Aa, the second delivery encoder 20Ab, the third delivery encoder 20Ac, . . . , and the n-th delivery encoder 20An.

By executing the feedback control as described above, the first delivery encoder 20Aa, the second delivery encoder 20Ab, the third delivery encoder 20Ac, . . . , and the n-th delivery encoder 20An respectively obtain the first video encoding bit rate 41Aa, the second video encoding bit rate 41Ab, the third video encoding bit rate 41Ac, and the n-th video encoding bit rate 41An from the statistical multiplexing controller 40A. The first delivery encoder 20Aa, the second delivery encoder 20Ab, the third delivery encoder 20Ac, . . . , and the n-th delivery encoder 20An encode the first video/voice 14a, the second video/voice 14b, the third video/voice 14c, . . . , and the n-th video/voice 14n, respectively, at an appropriate bit rate. As a result, the first TS 21a, the second TS 21b, the third TS 21c, . . . , and the n-th TS 21n can be generated without degrading the video quality. The first TS 21a, the second TS 21b, the third TS 21c, . . . , and the n-th TS 21n are each output to the TS-MUX 30.

The TS-MUX 30 multiplexes the received first TS 21a, second TS 21b, third TS 21c, . . . , and n-th TS 21n and outputs them as a transport stream TSm.

As described above, in the video encoding system shown in FIG. 3, the image feature values (the first image feature value 22a, the second image feature value 22b, the third image feature value 22c, . . . , and the n-th image feature value 22n), which are obtained after video encoding and analyzed in the first delivery encoder 20Aa, the second delivery encoder 20Ab, the third delivery encoder 20Ac, . . . , and the n-th delivery encoder 20An of the delivery encoder group 20A, are notified to the statistical multiplexing controller 40A. Further, the statistical multiplexing controller 40A performs the statistical multiplexing control for calculating the bit rates (the first video encoding bit rate 41Aa, the second video encoding bit rate 41Ab, the third video encoding bit rate 41Ac, . . . , and the n-th video encoding bit rate 41An) to be allocated to each of the first delivery encoder 20Aa, the second delivery encoder 20Ab, the third delivery encoder 20Ac, . . . , and the n-th delivery encoder 20An. To accomplish such operations, it is necessary to employ a feedback type control.

In this case, a steep change may occur in the image feature values relating to the first video/voice 14a, the second video/voice 14b, the third video/voice 14c, . . . , and the n-th video/voice 14n. In such a case, it is difficult to allow the bit rate control for allocating bit rates to the delivery encoders 20Aa, 20Ab, 20Ac, and 20An to follow the real-time video encoding timing in each delivery encoder.

CITATION LIST

Patent Literature

Patent Literature 1: Japanese Unexamined Patent Application Publication No. 2006-74332 (pages 3-5)

SUMMARY OF INVENTION

Technical Problem

As described above, in the statistical multiplexing control in the video encoding system of the related art, the image feature values analyzed by each delivery encoder are analyzed by the statistical multiplexing controller, thereby calculating bit rates to be allocated to each delivery encoder, that is, video encoding bit rates. For this reason, a feedback-type control is employed as the statistical multiplexing control. Accordingly, there is a problem that if there is a steep change in the image feature values, it is difficult to allow the bit rate control for allocating bit rates to the delivery encoders to follow the real-time video encoding timing.
(Object of the Present Invention)

The present invention has been made in view of the above-mentioned problem, and therefore it is an object of the present invention to provide a video encoding system, a program bank device, and a video encoding method that allow a video encoding bit rate to follow a steep change in an image feature value, without increasing a delay time in a real-time encoder.

Solution to Problem

To solve the above-mentioned problem, the video encoding system, the program back device, and the video encoding method according to the present invention mainly employ the following characteristic configurations.

A video encoding system according to the present invention includes:
a program bank device that accumulates video/voice data of a program for broadcasting and retrieves video/voice data of a program to be delivered, in accordance with program operation information supplied from a program operation management server operating in cooperation;
one or more delivery encoders that encode the retrieved video/voice data of the program into a state compatible with a transport stream format; and
a statistical multiplexing controller that performs statistical multiplexing analysis processing relating to an image feature value extracted from video data of the program to be delivered, and calculates a video encoding bit rate for use in encoding the video data in the delivery encoders, in which:
the program bank device includes:
one or more encoders that perform compression coding on the video/voice data of the program and extract the image feature value of the video data of the program;
a program database that accumulates both the video/voice data of the program and the extracted image feature value, the video/voice data being compression-coded by the encoders;
one or more decoders that decode the video/voice data relating to the program accumulated in the program database and output the decoded video/voice data to the delivery encoders, when a program delivery time indicated by the program operation information is reached; and
a unit that retrieves the image feature value of the video data relating to the program accumulated in the program database and notifies the statistical multiplexing controller of the retrieved image feature value, when a time earlier by a predetermined time than the program delivery time indicated by the program operation information is reached; and
the statistical multiplexing controller performs the statistical multiplexing analysis processing relating to the image feature value of the video data of the program notified from the program bank device to preliminarily calculate a video encoding bit rate for the delivery encoders, by referring to the program delivery time indicated by the program operation information supplied from the program operation management server, and outputs the calculated video encoding bit rate to the delivery encoders at a timing when the decoded video/voice data of the program is output to the delivery encoders from the decoders of the program bank device.

A program bank device according to the present invention is a program bank device that accumulates video/voice data of a program for broadcasting, the program bank device including:
one or more encoders that perform compression coding on the video/voice data of the program and extract an image feature value of video data of the program;
a program database that accumulates both the video/voice data of the program and the extracted image feature value, the video/voice data being compression-coded by the encoders;
one or more decoders that decode the video/voice data relating to the program accumulated in the program database and output the decoded video/voice data to a delivery encoder, when a program delivery time indicated by program operation information supplied from a program operation management server operating in cooperation is reached, the delivery encoder being configured to encode the video/voice data into a state compatible with a transport stream format; and
a unit that retrieves the image feature value of the video data relating to the program accumulated in the program database and notifies the statistical multiplexing controller of the retrieved image feature value, when a time earlier by a predetermined time than the program delivery time indicated by the program operation information is reached.

a video encoding method according to the present invention is a video encoding method that retrieves video/voice data of a program to be delivered from a program bank device that accumulates video/voice data of a program for broadcasting, in accordance with program operation information supplied from a program operation management server operating in cooperation, to encode, by one or more delivery encoders, the video/voice data into a state compatible with a transport stream format, and outputs the encoded video/voice data, the method including:
extracting an image feature value of video data of the program when the video/voice data of the program is accumulated in the program bank device;
accumulating the extracted image feature value with the video/voice data of the program;

retrieving the image feature value relating to the accumulated program when a time earlier by a predetermined time than a delivery time of the program indicated by the program operation information is reached, and performing statistical multiplexing analysis processing to preliminarily calculate a video encoding bit rate for use in decoding the video data in the delivery encoders; and outputting the video/voice data of the program accumulated in the program bank device to the delivery encoders and outputting the preliminarily calculated video encoding bit rate to the delivery encoders, when the program delivery time indicated by the program operation information is reached.

Advantageous Effects of Invention

According to the video encoding system, the program bank device, and the video encoding method of the present invention, the following advantageous effects can be obtained.

A first advantageous effect is as follows.

That is, the image feature value accumulated in the program bank device is notified to the statistical multiplexing controller at an appropriate timing before the delivery of a program.

As a result, the video encoding bit rate can be preliminarily calculated, even when a steep change occurs in the image feature value.

Accordingly, it is possible to perform encoding in each delivery encoder by allowing the video encoding bit rate to follow the video/voice data delivered from the program bank device, when the program delivery time is reached.

Therefore, deterioration in the image quality can be suppressed.

A second advantageous effect is as follows.

That is, the configuration of the present invention eliminates the need for a delay circuit, unlike the method using a two-pass real-time encoder as disclosed in Patent Literature 1 (Japanese Unexamined Patent Application Publication No. 2006-74332) described above.

Accordingly, the delay time of each delivery encoder can be drastically reduced.

DESCRIPTION OF EMBODIMENTS

Hereinafter, exemplary embodiments of a video encoding system, a program bank device, and a video encoding method according to the present invention will be described with reference to the accompanying drawings. While in the following description, the video encoding system, the program bank device, and the video encoding method according to the present invention are described, the video encoding method may also be implemented as a video encoding program that can be executed by a computer. Alternatively, the video encoding program may be recorded in a computer-readable storage medium.

(The Outline of the Present Invention)

Prior to the description of exemplary embodiments of the present invention, the outline of features of the present invention will first be described. According to the present invention, upon registration of video material in a program database of a program bank device, a feature value of the video is calculated and stored in the program database together with the video material. An image feature value stored so as to correspond to the video of the program is retrieved from the program database at an appropriate time before the delivery of the program discriminated by obtaining program operation information from a program operation management server. The retrieved image feature value is delivered in advance to a statistical multiplexing controller and used for statistical multiplexing analysis processing in the statistical multiplexing controller. This enables allocation of the video encoding bit rate to each delivery encoder according to the image feature value, without impairing the real-time performance.

In other words, according to the present invention, the image feature value of the video data preliminarily registered in the program bank device is analyzed in advance. At an appropriate timing before the delivery of a program, the image feature value is delivered to the statistical multiplexing controller (statistical multiplexing control device). This enables allocation of the video encoding bit rate to each delivery encoder, while allowing the video encoding bit rate to follow the timing for encoding the video, without increasing the delay time in the real-time encoder even when a steep change occurs in the image feature value. Accordingly, video/voice data can be encoded into a state compatible with a transport stream format in real time with no delay.

The present invention will be described in more detail from a different angle. In the present invention, upon registration of program material in the program bank device, the image feature values output during compression coding in each encoder in the program bank device are preliminarily registered in the program bank device, together with the compression-coded video/voice data. After that, at an appropriate time immediately before the delivery of the program, that is, at an appropriate time earlier than the output of the video/voice data of the program from the program bank device, the image feature value relating to the preliminarily registered video is delivered from the program bank device to the statistical multiplexing controller. This makes it possible to output the video encoding bit rate to each delivery encoder from the statistical multiplexing controller, while allowing the video encoding bit rate to follow the output of the video from the program bank device upon delivery of the program, even when a steep change occurs in the image feature value.

(Exemplary Embodiments of the Present Invention)

Figure 1:
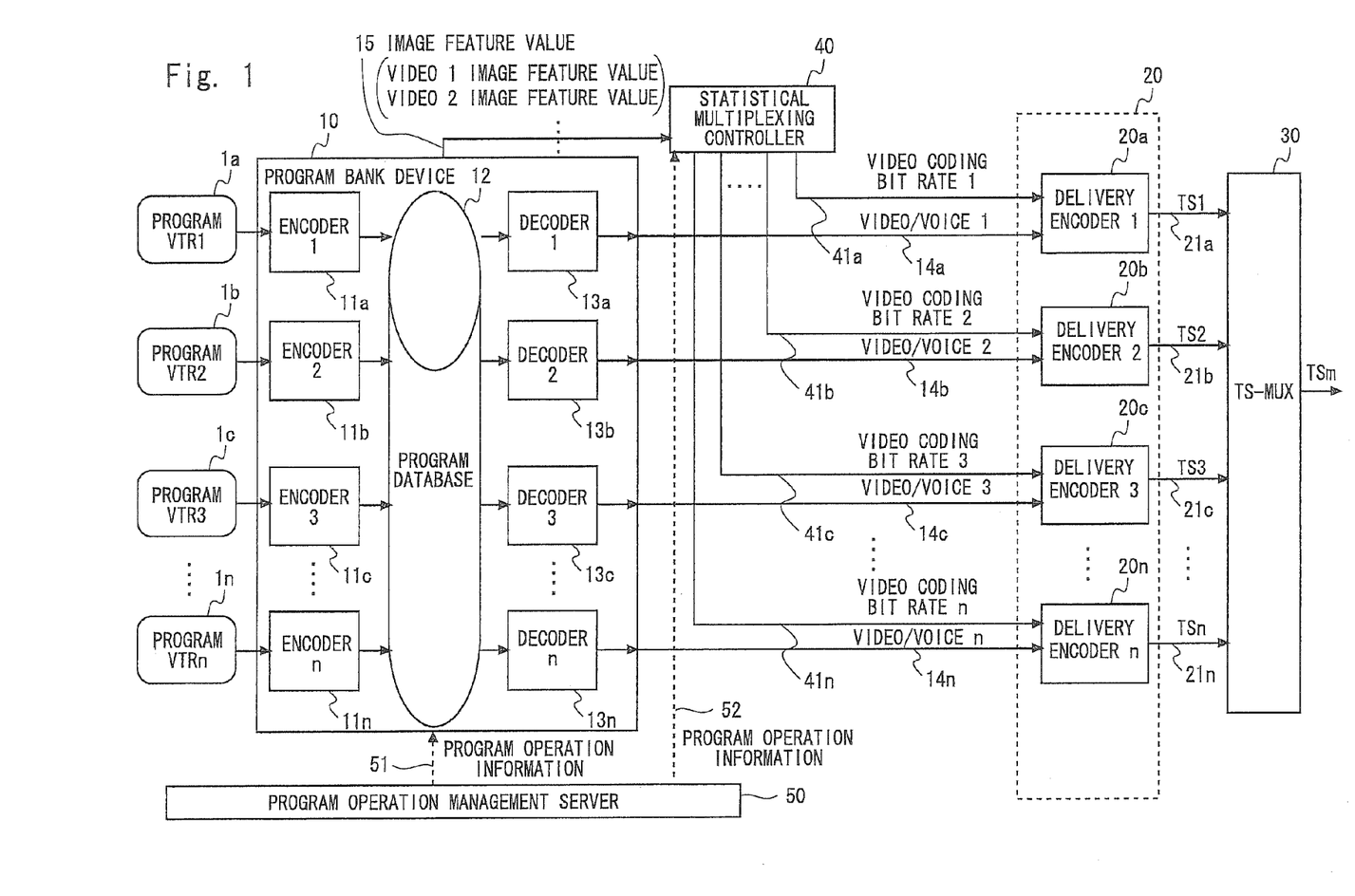
FIG. 1 is a system configuration diagram showing an example of a system configuration of a video encoding system according to the present invention.

Next, an example of a system configuration of a video encoding system according to the present invention will be described with reference to FIG. 1. FIG. 1 is a system configuration diagram showing an example of the system configuration of the video encoding system according to the present invention. The video encoding system shown in FIG. 1 includes at least a program bank device 10, a delivery encoder group 20, a TS-MUX 30, and a statistical multiplexing controller 40, and operates in cooperation with a program operation management server 50.

The program bank device 10 includes one or more encoders 11a, 11b, 11c, and 11n, a program database 12, and one or more decoders 13a, 13b, 13c, and 13n. A first program VTR 1a, a second program VTR 1b, a third program VTR 1c, ..., and an n-th program VTR 1n record video/voice information for each program. The one or more encoders 11a, 11b, 11c, and 11n temporarily perform compression coding on video/voice information from the first program VTR 1a, the second program VTR 1b, the third program VTR 1c, ..., and the n-th program VTR 1n, for example, and extract feature values of each video data. The program database 12 accumulates the compression-coded video/voice data for each program, together with the feature values of each video.

The first decoder 13*a*, the second decoder 13*b*, the third decoder 13*c*, . . . , and the n-th decoder 13*n* decode the video/voice data for each program accumulated in the program database 12, and output them as one or more videos/voices. Specifically, the first decoder 13*a*, the second decoder 13*b*, the third decoder 13*c*, . . . , and the n-th decoder 13*n* respectively output a first video/voice 14*a*, a second video/voice 14*b*, a third video/voice 14*c*, . . . , and an n-th video/voice 14*n*.

Note that in FIG. 1, the terms "first xx", "third xx", "second xx", . . . , and "n-th xx" of the first program VTR 1*a*, the second program VTR 1*b*, the third program VTR 1*c*, . . . , and the n-th program VTR 1*n*, the first encoder 11*a*, the second encoder 11*b*, the third encoder 11*c*, . . . , and the n-th encoder 11*n*, the first video/voice 14*a*, the second video/voice 14*b*, the third video/voice 14*c*, . . . , and the n-th video/voice 14*n*, the first decoder 13*a*, the second decoder 13*b*, the third decoder 13*c*, and the n-th decoder 13*n*, and the like are represented as "xx1", "xx2", "xx3", . . . , and "xxn" so as to simplify the illustration (the same is applied to the other terms).

The program bank device 10 and the program operation management server 50 operate in cooperation with each other. The program operation management server 50 delivers program operation information 51 to the program bank device 10. The program bank device 10 discriminates an appropriate timing immediately before the delivery of a program based on the program operation information 51. The program bank device 10 delivers an image feature value 15 relating to video data corresponding to the program, which is accumulated in the program database 12, to the statistical multiplexing controller 40 as a first video image feature value, a second video image feature value, a third video image feature value, . . . , and an n-th video image feature value at an appropriate timing immediately before the delivery of this program.

The statistical multiplexing controller 40 receives the image feature value 15 from the program bank device 10. Then, the statistical multiplexing controller 40 performs statistical multiplexing analysis processing while referring to program operation information 52 supplied from the program operation management server 50. Through the processing, the statistical multiplexing controller 40 calculates encoding bit rates for encoding the video data having the image feature value 15. The statistical multiplexing controller 40 delivers a first video encoding bit rate 41*a*, a second video encoding bit rate 41*b*, a third video encoding bit rate 41*c*, . . . , and an n-th video encoding bit rate 41*n* to the delivery encoder group 20.

The delivery encoder group 20 includes one or more delivery encoders, i.e., a first delivery encoder 20*a*, a second delivery encoder 20*b*, a third delivery encoder 20*c*, . . . , and an n-th delivery encoder 20*n*. The first delivery encoder 20*a*, the second delivery encoder 20*b*, the third delivery encoder 20*c*, . . . , and the n-th delivery encoder 20*n* encode video/voice data for each program into a state compatible with a transport stream format. The first delivery encoder 20*a*, the second delivery encoder 20*b*, the third delivery encoder 20*c*, . . . , and the n-th delivery encoder 20*n* respectively encode the first video/voice 14*a*, the second video/voice 14*b*, the third video/voice 14*c*, . . . , and the n-th video/voice 14*n*, which are delivered from the program bank device 10, into the state compatible with the transport stream format based on appropriate bit rates of the first video encoding bit rate 41*a*, the second video encoding bit rate 41*b*, the third video encoding bit rate 41*c*, . . . , and the n-th video encoding bit rate 41*n* which are delivered from the statistical multiplexing controller 40. The first delivery encoder 20*a*, the second delivery encoder 20*b*, the third delivery encoder 20*c*, . . . , and the n-th delivery encoder 20*n* respectively generate a first TS 21*a*, a second TS 21*b*, a third TS 21*c*, . . . , and an n-th TS 21*n*, and output them to the TS-MUX 30.

The TS-MUX 30 multiplexes the received first TS 21*a*, second TS 21*b*, third TS 21*c*, . . . , and n-th TS 21*n* and outputs them as a transport stream TSm to a subsequent-stage program transmission system.

A basic system operation example in the video encoding system shown in FIG. 1 will be described in more detail below. Program video/voice information is preliminarily recorded in VTRs such as the first program VTR 1*a*, the second program VTR 1*b*, the third program VTR 1*c*, . . . , and the n-th program VTR 1*n*. These pieces of program video/voice information are input to the program bank device 10. The encoders in the program bank device 10, i.e., the first encoder 11*a*, the second encoder 11*b*, the third encoder 11*c*, . . . , and the n-th encoder 11*n*, perform compression coding on the program video/voice information. These pieces of compression-coded information are accumulated in the program database 12.

After that, the video/voice data relating to the program, which is compression-coded and accumulated in the program database 12, is decoded according to the date/time described in the broadcast operation information 51 supplied from the program operation management server 50. The decoded video/voice data is transmitted to the first delivery encoder 20*a*, the second delivery encoder 20*b*, the third delivery encoder 20*c*, . . . , and the n-th delivery encoder 20*n* of the delivery encoder group 20, as the first video/voice 14*a*, the second video/voice 14*b*, the third video/voice 14*c*, . . . , and the n-th video/voice 14*n*, respectively.

Each of the first delivery encoder 20*a*, the second delivery encoder 20*b*, the third delivery encoder 20*c*, . . . , and the n-th delivery encoder 20*n* of the delivery encoder group 20 receives the video/voice data transmitted from the program bank device 10, and encodes the video/voice data into MPEG2 data or the like compatible with the transport stream format. After that, the video/voice data, such as MPEG2 data, which has been encoded by each of the delivery encoders 20*a*, 20*b*, 20*c*, . . . , and 20*n*, is multiplexed by the TS-MUX 30. The multiplexed video/voice data is output to the subsequent-stage broadcast transmission system as the transport stream TSm.

In this case, in the video encoding system shown in FIG. 1, upon registration of the video/voice data of the program into the program bank device 10, one or more encoders in the program bank device 10, i.e., the first encoder 11*a*, the second encoder 11*b*, the third encoder 11*c*, . . . , and the n-th encoder 11*n*, temporarily encode the video by using a format such as MPEG2 or H.264. Further, when the video information is encoded using a format such as MPEG2 or H.264, image feature values are extracted for each frame of the video, and the extracted image feature values are registered in the program database 12 of the program bank device 10, together with encoded video frames.

After that, when the program delivery time approaches, the image feature value relating to the program is delivered from the program database 12 of the program bank device 10 to the statistical multiplexing controller 40 at an appropriate time earlier by a predetermined time than the program delivery time according to the program operation information 51. Before the video/voice data relating to the program is encoded in each of the first delivery encoder 20*a*, the second delivery encoder 20*b*, the third delivery encoder 20*c*, . . . , and the n-th delivery encoder 20*n* of the delivery encoder group 20, the statistical multiplexing controller 40 preliminarily calculates the video encoding bit rate for use in encoding the video data of the program.

After that, when the program delivery time is reached, the program bank device 10 provides the video/voice data relating to the program to each of the first delivery encoder 20*a*, the second delivery encoder 20*b*, the third delivery encoder 20*c*, . . . , and the n-th delivery encoder 20*n* of the delivery encoder group 20. Simultaneously with this time, the statistical multiplexing controller 40 also notifies the corresponding delivery encoder of the preliminarily calculated video encoding bit rate relating to the program. The delivery encoder can encode the video data received from the program bank device 10 according to the video encoding bit rate received from the statistical multiplexing controller 40 in real time without causing any delay.

(Description of Operation of Exemplary Embodiments)

Figure 2:
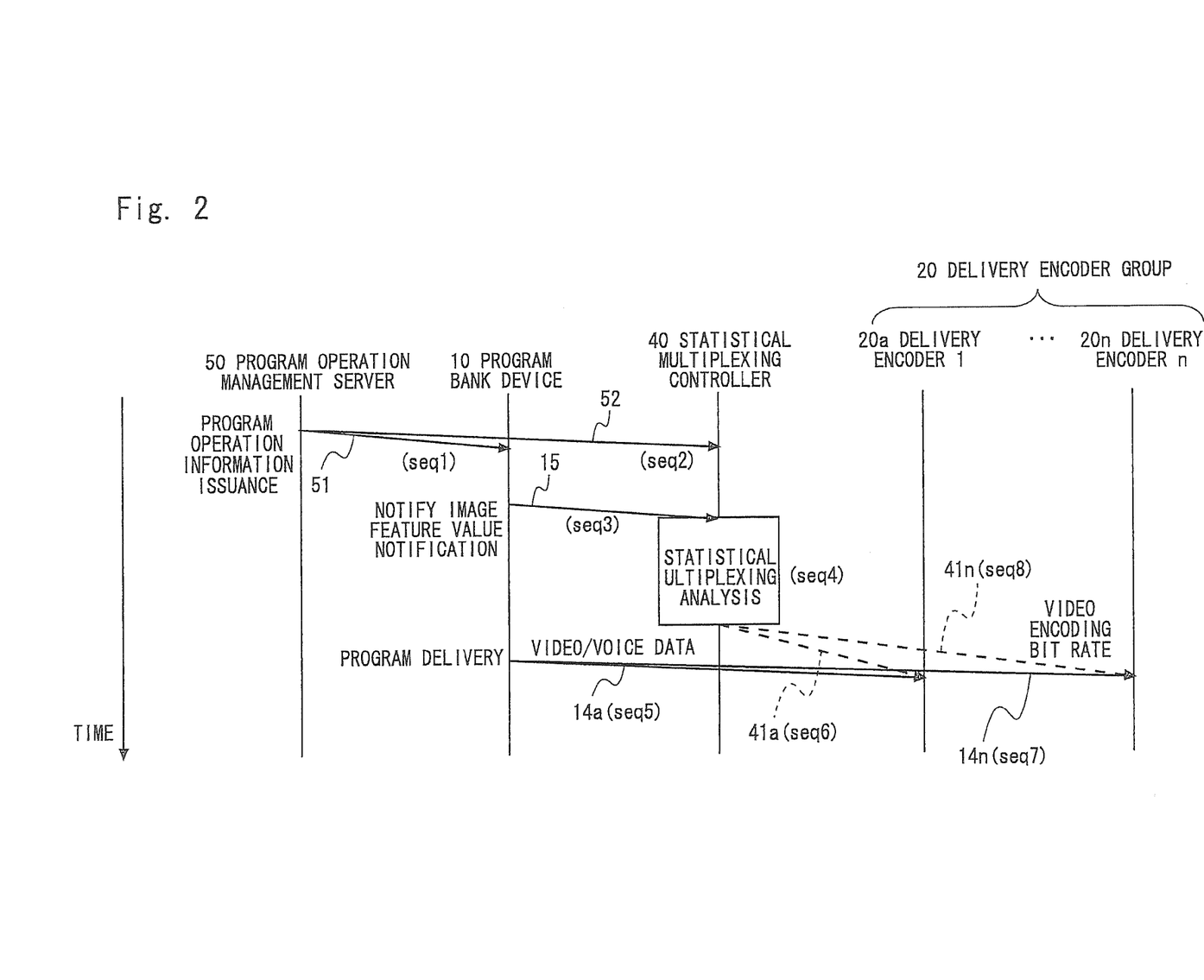
FIG. 2 is a sequence diagram for explaining an example of operation of the video encoding system shown in FIG. 1.

Next, an operation example of the video encoding system according to the present invention shown in FIG. 1 will be described with reference to the sequence diagram of FIG. 2. FIG. 2 is a sequence diagram for explaining an example of the operation of the video encoding system shown in FIG. 1. The sequence diagram shows, in time sequence, the information transmission/reception states of each of the program bank device 10, the statistical multiplexing controller 40, the delivery encoder 20*a* and the delivery encoder 20*n* of the delivery encoder group 20, and the program operation management server 50 operating in cooperation.

In the sequence diagram shown in FIG. 2, the program operation management server 50 constantly issues the program operation information 51 and the program operation information 52 to the program bank device 10 and the statistical multiplexing controller 40, respectively, at an appropriate timing (sequences Seq1 and Seq2). Each of the program operation information 51 and the program operation information 52 includes a program delivery time, a video encoding bit rate for each delivery encoder, and encoding priorities of the delivery encoders, for example.

The program bank device 10 having received the program operation information 51 notifies the statistical multiplexing controller 40 of the image feature value 15 relating to the video frame of the program preliminarily accumulated in the program database 12, when a time earlier by a predetermined time T than the program delivery time is reached (sequence Seq3). The statistical multiplexing controller 40 having received the image feature value 15 performs the statistical multiplexing analysis processing based on the program operation information 52 notified in advance from the program operation management server 50 and the image feature value 15 received from the program bank device 10. Through the processing, the statistical multiplexing controller 40 calculates the video encoding bit rates to be allocated to the delivery encoders (the first delivery encoder 20*a* to the n-th delivery encoder 20*n*) of the delivery encoder group 20 (sequence Seq4).

After that, when the program delivery time is reached, the program bank device 10 transmits each video/voice data (the first video/voice 14*a* to the n-th video/voice 14*n*) of the program to the delivery encoders (the first delivery encoder 20*a* to the n-th delivery encoder 20*n*) of the delivery encoder group 20 (sequences Seq5 and Seq7). Simultaneously with this, the statistical multiplexing controller 40 also notifies the delivery encoders (the first delivery encoder 20*a* to the n-th delivery encoder 20*n*) of each video encoding bit rate (the first video encoding bit rate 41*a* to the n-th video encoding bit rate 41*n*) of the corresponding program (sequences Seq6 and Seq8).

Each of the delivery encoders (the first delivery encoder 20*a* to the n-th delivery encoder 20*n*) encodes each video/voice data (the first video/voice 14*a* to the n-th video/voice 14*n*), which has been transmitted from the program bank device 10, according to the corresponding video encoding bit rate (the first video encoding bit rate 41*a* to the n-th video encoding bit rate 41*n*) notified from the statistical multiplexing controller 40. The video/voice data encoded in each of the delivery encoders (the first delivery encoder 20*a* to the n-th delivery encoder 20*n*) is multiplexed in the TS-MUX 30 and transmitted to the subsequent-stage broadcast transmission system.

Note that as described above, MPEG, H.264, and the like can be utilized as the coding system used when the encoders (the first encoder 11*a* to the n-th encoder 11*n*) in the program bank device 10 temporarily perform compression coding so as to accumulate the program video/voice information in the program database 12, and can also be utilized as the coding system when the delivery encoders (the first delivery encoder 20*a* to the n-th delivery encoder 20*n*) perform encoding into a state compatible with the transport stream format to be output to the TS-MUX 30. Further, the time when a video bandwidth control is completed can be predicted not only for videos but also for other data such as voice and data broadcasting, as a matter of course.

(Description of Advantageous Effects of Exemplary Embodiments)

As described in detail above, the following advantageous effects can be obtained in the exemplary embodiments of the present invention.

That is, the image feature value accumulated in the program bank device 10 is notified to the statistical multiplexing controller 40 at an appropriate timing before the delivery of a program. This makes it possible to preliminarily calculate the video encoding bit rate even when a steep change occurs in the image feature value. This allows each delivery encoder to perform encoding, while allowing the video encoding bit rate to follow the video/voice data delivered from the program bank device 10, when the program delivery time is reached. Therefore, deterioration in the image quality can be suppressed.

Further, the configuration of the present invention eliminates the need for a delay circuit, unlike the method using a two-pass real-time encoder as disclosed in Patent Literature 1 (Japanese Unexamined Patent Application Publication No. 2006-74332) described above. Accordingly, the delay time of each delivery encoder can be drastically reduced.

The configurations according to exemplary embodiments of the present invention have been described above. However, it should be noted that these exemplary embodiments are illustrated by way of example only and do not limit the present invention. It can be easily understood by those skilled in the art that the present invention can be modified and changed in various ways depending on specific applications without departing from the scope of the present invention.

In the above-described exemplary embodiments, the present invention is described as a hardware configuration, but the present invention is not limited thereto. The above-described processing can be executed by a CPU (Central Processing Unit) using a computer program. The computer program can be stored in any type of non-transitory computer readable media and can be provided to a computer from the computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magnetooptical disks), CD-ROM (Read Only Memory), CD-R, CD-R/W, and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

This application is based upon and claims the benefit of priority from Japanese patent application No. 2011-198311, filed on Sep. 12, 2011, the disclosure of which is incorporated herein in its entirety by reference.

REFERENCE SIGNS LIST

1a ... first program VTR, 1b ... second program VTR, 1c ... third program VTR, 1n ... n-th program VTR, 10 ... program bank device, 10A ... program bank device, 11Aa ... first encoder, 11Ab ... second encoder, 11Ac ... third encoder, 11An ... n-th encoder, 11a ... first encoder, 11b ... second encoder, 11c ... third encoder, 11n ... n-th encoder, 12 ... program database, 12A ... program database, 13a ... first decoder, 13b ... second decoder, 13c ... third decoder, 13n ... n-th decoder, 14a ... first video/voice, 14b ... second video/voice, 14c ... third video/voice, 14n ... n-th video/voice, 15 ... image feature value, 20 ... delivery encoder group, 20A ... delivery encoder group, 20Aa ... first delivery encoder, 20Ab ... second delivery encoder, 20Ac ... third delivery encoder, 20An ... n-th delivery encoder, 20a ... first delivery encoder, 20b ... second delivery encoder, 20c ... third delivery encoder, 20n ... n-th delivery encoder, 21a ... first TS, 21b ... second TS, 21c ... third TS, 21n ... n-th TS, 22a ... first image feature value, 22b ... second image feature value, 22c ... third image feature value, 22n ... n-th image feature value, 30 ... TS-MUX, 40 ... statistical multiplexing controller, 40A ... statistical multiplexing controller, 41Aa ... first video encoding bit rate, 41Ab ... second video encoding bit rate, 41Ac ... third video encoding bit rate, 41An ... n-th video encoding bit rate, 41a ... first video encoding bit rate, 41b ... second video encoding bit rate, 41c ... third video encoding bit rate, 41n ... n-th video encoding bit rate, 50 ... program operation management server, 51 ... program operation information, 52 ... program operation information.

The invention claimed is:

1. A video encoding system comprising:
a program bank device that accumulates video/voice data of a program for broadcasting and retrieves video/voice data of a program to be delivered, in accordance with program operation information supplied from a program operation management server operating in cooperation;
one or more delivery encoders that encode the retrieved video/voice data of the program into a state compatible with a transport stream format; and
a statistical multiplexing controller that performs statistical multiplexing analysis processing relating to an image feature value extracted from video data of the program to be delivered, and calculates a video encoding bit rate for use in encoding the video data in the delivery encoders, wherein
the program bank device includes:
one or more encoders that perform compression coding on the video/voice data of the program and extract the image feature value of the video data of the program;
a program database that accumulates both the video/voice data of the program and the extracted image feature value, the video/voice data being compression-coded by the encoders; one or more decoders that decode the video/voice data relating to the program accumulated in the program database and output the decoded video/voice data to the delivery encoders, when a program delivery time indicated by the program operation information is reached; and
a unit that retrieves the image feature value of the video data relating to the program accumulated in the program database and notifies the statistical multiplexing controller of the retrieved image feature value, when a time earlier by a predetermined time than the program delivery time indicated by the program operation information is reached, and
the statistical multiplexing controller performs the statistical multiplexing analysis processing relating to the image feature value of the video data of the program notified from the program bank device to preliminarily calculate a video encoding bit rate for the delivery encoders, by referring to the program delivery time indicated by the program operation information supplied from the program operation management server, and outputs the calculated video encoding bit rate to the delivery encoders at a timing when the decoded video/voice data of the program is output to the delivery encoders from the decoders of the program bank device.

2. The video encoding system according to claim 1, wherein the delivery encoders encode the video/voice data, in synchronization with each other, into a state compatible with a transport stream format by using the video encoding bit rate output from the statistical multiplexing controller, the video/voice data being output from the decoders of the program bank device.

3. The video encoding system according to claim 1, wherein the encoders included in the program bank device use one of MPEG and H.264 as an encoding method for performing compression coding on video/voice data of a program and extracting an image feature value of video data of the program.

4. A program bank device that accumulates video/voice data of a program for broadcasting, comprising:
one or more encoders that perform compression coding on the video/voice data of the program and extract an image feature value of video data of the program;
a program database that accumulates both the video/voice data of the program and the extracted image feature value, the video/voice data being compression-coded by the encoders;
one or more decoders that decode the video/voice data relating to the program accumulated in the program database and output the decoded video/voice data to a delivery encoder, when a program delivery time indicated by program operation information supplied from a program operation management server operating in cooperation is reached, the delivery encoder being configured to encode the video/voice data into a state compatible with a transport stream format; and
a unit that retrieves the image feature value of the video data relating to the program accumulated in the program database and notifies the statistical multiplexing controller of the retrieved image feature value, when a time earlier by a predetermined time than the program delivery time indicated by the program operation information is reached.

5. The program bank device according to claim 4, wherein the encoders use one of MPEG and H.264 as an encoding method for performing compression coding on video/voice data of a program and extracting an image feature value of video data of the program.

6. A video encoding method that retrieves video/voice data of a program to be delivered from a program bank device that accumulates video/voice data of a program for broadcasting, in accordance with program operation information supplied from a program operation management server operating in cooperation, to encode, by one or more delivery encoders, the video/voice data into a state compatible with a transport stream format, and outputs the encoded video/voice data, the method comprising:

extracting an image feature value of video data of the program when the video/voice data of the program is accumulated in the program bank device;

accumulating the extracted image feature value with the video/voice data of the program;

retrieving the image feature value relating to the accumulated program when a time earlier by a predetermined time than a delivery time of the program indicated by the program operation information is reached, and performing statistical multiplexing analysis processing to preliminarily calculate a video encoding bit rate for use in decoding the video data in the delivery encoders; and     outputting the video/voice data of the program accumulated in the program bank device to the delivery encoders and outputting the preliminarily calculated video encoding bit rate to the delivery encoders, when the program delivery time indicated by the program operation information is reached.

7. The video encoding method according to claim 6, wherein the delivery encoders encode the output video/voice data of the program into a state compatible with a transport stream format by using the video encoding bit rate output at the same time.

8. The video encoding method according to claim 6, wherein upon accumulation of the video/voice data of the program and the extracted image feature value in the program bank device, one of MPEG and H.264 is used as an encoding method to perform compression coding on the video/voice data of the program and to extract the image feature value, and the extracted image feature value and the compression-coded video/voice data are accumulated in the program bank device.

9. A non-transitory program recording medium storing a video encoding program for causing a computer incorporated in the encoding sytem according to claim 1 to function as the program bank device, the delivery encoder, and the statistical multiplexing controller.

* * * * *